United States Patent [19]

Smith et al.

[11] 4,162,725

[45] Jul. 31, 1979

[54] BALE THROWER

[75] Inventors: Charles A. Smith, New Holland; Clair S. Adams, Akron, both of Pa.

[73] Assignee: Sperry Rand Corporation, New Holland, Pa.

[21] Appl. No.: 811,792

[22] Filed: Jun. 30, 1977

[51] Int. Cl.² .................. B65G 15/14; B65G 31/02; B65G 21/10
[52] U.S. Cl. .................................. 198/628; 198/632; 198/638
[58] Field of Search ............... 198/627, 628, 632, 638, 198/641, 362

[56] References Cited

U.S. PATENT DOCUMENTS

| 3,095,961 | 7/1963 | Hollyday | 198/638 |
| 3,114,450 | 12/1963 | Beiler | 198/628 |
| 3,181,686 | 5/1965 | Hurlburt | 198/638 |
| 3,307,680 | 3/1967 | Luedtke | 198/641 |
| 3,987,890 | 10/1976 | Merritt | 198/641 |

Primary Examiner—Robert B. Reeves
Assistant Examiner—Jeffrey V. Nase
Attorney, Agent, or Firm—John B. Mitchell; Frank A. Seemar; Ralph D'Alessandro

[57] ABSTRACT

An improved bale thrower for use with a hay baler is disclosed. The thrower affixes to the discharge end of the bale case of the baler and can be selectively pivoted vertically about at least one horizontal axis between a first operative position for directionally ejecting bales and a second inoperative position which allows the bales to be deposited directly on the ground behind the baler.

10 Claims, 4 Drawing Figures

BALE THROWER

BACKGROUND OF THE DISCLOSURE

This invention relates generally to bale throwers, and specifically to a bale thrower which may be selectively pivoted vertically about at least one horizontal axis between a first operative position and a second inoperative position.

Bale throwers are, in general, very well known equipment accessories employed extensively throughout the agricultural community. The increasing mechanization of farm procedures in pursuit of economy has all but totally eliminated the manual "bucking" of bales from the ground to a moving truck bed or wagon. Today, it is not only more convenient, but in many cases necessary that every labor saving device be employed to its fullest—and the bale thrower fills this need.

Basically, there are two main types of baler throwers, the "pan"-type and "belt"-type. The invention to be described herein relates more to the latter category, but, in its broadest sense could be equally applicable to any type of thrower. General examples of the prior art bale throwers and specific features thereof are disclosed in U.S. Pat. Nos. 3,132,754; 3,059,755; 3,095,962 and 3,110,392.

Various circumstances arise which make it desirable to be able to easily select a mode of bale handling, i.e., whether the bales are ejected through the thrower or deposited on the ground. For example, if the thrower itself breaks down, a considerable amount of valuable time can be lost if the baling operation cannot continue. Also, especially in regard to commercial operators, selectivety is important because some clients want the bales removed, and some of them want them left on the field. Furthermore, the situation where an insufficient number of wagons are available to keep up with the baling operation requires the mentioned selectivety.

Pan-type bale throwers are normally of such construction that bales may be fed directly to the ground when the apparatus is not functioning. Attention is directed to U.S. Pat. No. 3,155,223 which very clearly shows this characteristic. Bales discharged from bale case 26 are deposited on pan 98. If the thrower is operating, the bale is ejected upwardly and rearwardly by the swinging motion of the pan; however, if the thrower is not operating, the bale is pushed off the rear of the pan by the motion of subsequently formed bales through case 26.

The belt-type thrower has several advantages over the pan-type which are apparent to those of skill in the art, but the lack of operation mode selectivity has proven to be a drawback in those situations mentioned above. Heretofore, the only practical method of making an operational mode selection with a belt-type thrower has been to remove the thrower completely. This process, though not impossible, is at best inconvenient due to an average thrower weight from about 300 to about 500 pounds. A previously known solution to this problem is shown in U.S. Pat. No. 3,181,686. The thrower disclosed in this patent is pivoted about a vertical axis on the bale case from an operative to an inoperative position. Because of basic bale case design and structure, this apparatus is impractical. The tremendous moment arm created during the rotation of the thrower has a great tendency to twist the case and thus damage its ability to perform its function. The invention to be described below is not subject to this problem and is far superior thereto in operation and construction.

SUMMARY OF THE INVENTION

It is therefore an object of this invention to provide a bale thrower which may be selectively moved between an operative position and an inoperative position.

It is another object of this invention to provide a belt-type bale thrower for attachment to the discharge end of a bale case which is pivotable vertically between a first position in operative alignment with the bale case and a second inoperative position out of alignment therewith.

It is another object of this invention to provide a belt-type bale thrower in which each of the belts pivot upwardly about horizontal axes between operative and inoperative positions.

It is a further object of this invention to provide a hay baler and bale thrower combination which may selectively eject bales into a trailing wagon or drop them on the ground by pivoting the bale thrower vertically relative to the baler.

It is a still further object of this invention to provide a bale thrower of the character described which is durable of construction, relatively inexpensive of manufacture and extremely effective in use.

It is an even still further object of this invention to provide a bale thrower which may be easily pivoted to an inoperative position to allow access to the baler plunger for maintenance or removal.

These and other objects are accomplished by providing an improved bale thrower for use with a hay baler. The thrower affixes to the discharge end of the bale case of the baler and can be selectively pivoted vertically about at least one horizontal axis between a first operative position for directionally ejecting bales and second inoperative position which allows the bales to be deposited directly on the ground behind the baler.

BRIEF DESCRIPTION OF THE DRAWINGS

For a better understanding of the invention as well as other objects and further features thereof, reference is made to the following detailed disclosure of the preferred embodiment of the invention taken in conjunction with the accompanying drawings thereof wherein:

FIG. 4 is a sectional view of the bale thrower drive sheave, taken along line 4—4 of FIG. 1.

DESCRIPTION OF THE PREFERRED EMBODIMENT

Figure 1:
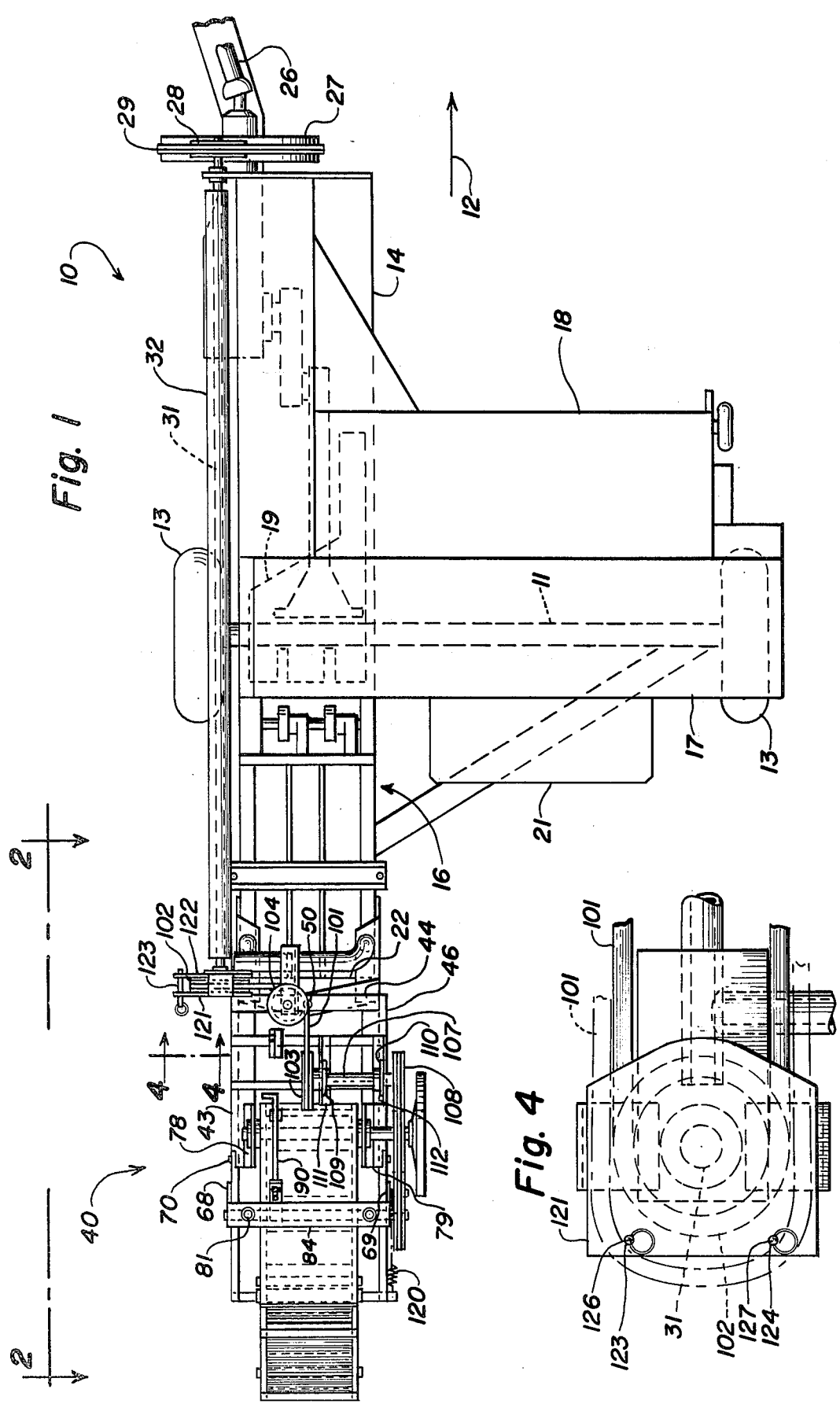
FIG. 1 is a partially schematic, top plan view of a baler showing the novel bale thrower affixed thereto.

Referring now to FIG. 1, the baler 10 will be described in general terms for illustrative purposes only, it being understood that the baler itself forms no part of the instant invention. A frame 11 is supported for ground travel in the direction of arrow 12 by a pair of wheels 13. The primary elements of the baler include a plunger housing 14, an in-line bale case 16, and an in-feed housing 17. A conventional crop pickup 18 feeds the cut crop material into the in-feed housing 17 which in turn conveys the crop into the plunger housing 14 wherein the reciprocating motion of the plunger 19 forms a bale. The individual bales are tied by either twine or wire which is stored in bulk in a twine box 21. As the individual bales are formed they are forced through the bale case 16 for ejection at the open discharge end 22 thereof. As can best be seen in FIGS. 2 and 3, the bale case 16 includes a top wall 23 and an opposing bottom wall 24. The bale thrower 40, which will be described in further detail below, is affixed to the discharge end of bale case 16.

The power from a prime mover such as a tractor is transmitted to the baler through a power-take-off 26 which is in driving relationship to the primary flywheel 27. The motive power for the bale thrower 40 is transferred through a drive shaft 31, protected by housing 32 via sheave 28 and endless belt 29.

Figure 2:
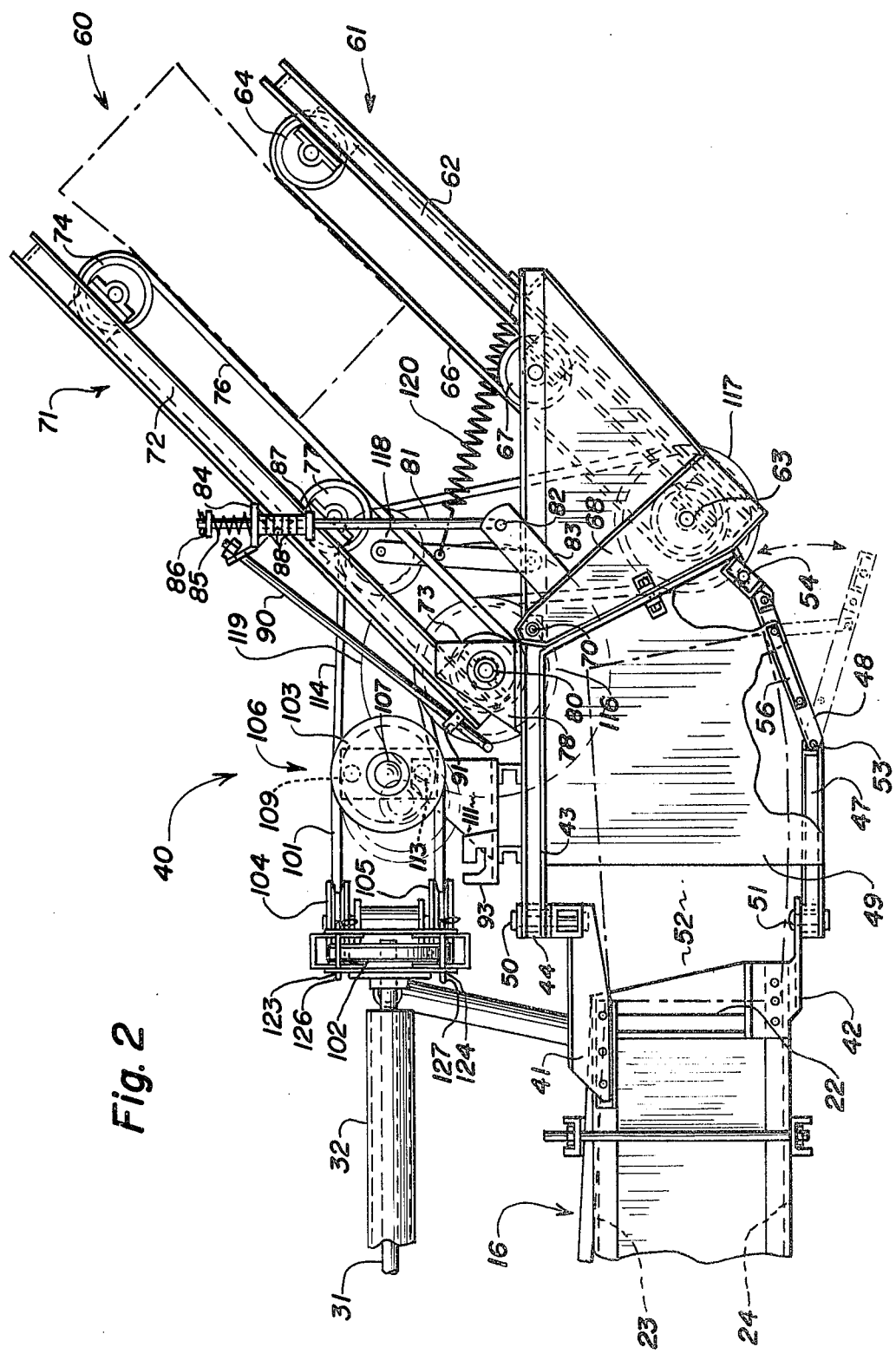
FIG. 2 is a partially schematic, partially cross sectional view of the bale thrower of the instant invention taken along line 2—2 of FIG. 1.

Attention is now directed to FIG. 2, though continued reference to FIG. 1 may be advantageous to better understand some of the elemental relationships. The thrower 40 includes a first frame comprised of elements 41 and 42 which are affixed respectively, to the top and bottom of the discharge end of the bale case 16. Frame elements 41 and 42 may be attached to the bale case in any suitable manner, but the affixment should be as rigid as possible to provide the stability and strength necessary to support the weight and moment arm of the thrower.

A second frame comprised of top elements 43, 44 and 46, bottom plates 47 and 48, and two opposed side panels, only one of which 49, can be seen. Top elements 43, 44 and 46 are connected to form a generally U-shape structure (best seen in FIG. 1) which is given added lateral stability by other structural elements to be described below. Element 44 is pivotally connected to frame element 41 by a pin 50 which forms a vertical axis of rotation for the thrower. Likewise, bottom plate 47 is pivotally connected to frame element 42 by a pin 51 which is in alignment with pin 50. Structurally, elements 43, 44, and 46-49 form an open-ended chamber through which a bale, such as 52, may pass on its way to discharge. Bottom plate 47 is substantially in alignment with bottom wall 24 of bale case 16 such that the bale need not flex an appreciable amount to pass between the case and the second frame.

Bottom plate 48 is pivotally connected, at 53, to plate 47 so that it may assume two functional positions. In the first of these positions, as shown in solid line in FIG. 2, it is slightly incline with respect to plate 47. The plate is fixed in this position by end bolts, only one of which, 54, is shown, so that it may guide the bales upwardly into the conveyor section to be described. When the bale thrower is moved to its inoperative position, and it is desired to deposit the bales on the ground, plate 48 is moved to its second position, shown in dotted line in FIG. 2 and solid line in FIG. 3. With the end bolts removed and support arms, only one of which, 56, is shown, pivoted and fixed to the side panels of the second frame, plate 48 is directed at a slight downward angle to direct the discharged bales to the ground.

The bale ejector portion of the thrower, shown generally as 60, includes driven conveyors 61 and 71. Lower conveyor 61 comprises a generally rectangular belt frame 62 upon which at least two rollers 63 and 64 are mounted for rotation. An endless belt 66 is suspended between rollers 63 and 64, and held taut therebetween for rotation therewith. Other rollers may be employed as required, such as 67, for support. Belt frame 62 is supported in the semi-cantilevered attitude of FIG. 2 by a pair of spaced apart arms 68 and 69 which are rigidly fixed to and project away from frame 62 at approximately a 90° angle. The end of each arm 68 and 69 remote from frame 62 is pivotally affixed to second frame elements 43 and 46, respectively, along a single horizontal axis of rotation 70. Additional strength to accommodate the moment arm of conveyor 61 is obtained by supporting arms 68 and 69 on the rearward edge of the side panels of the second frame.

Upper conveyor 71, similarly to conveyor 61, includes a belt frame 72, rollers 73 and 74, endless belt 76 and optional roller 77. A pair of upstanding dog ears, 78 and 79 are mounted in spaced relationship to second frame elements 43 and 46, respectively, and support the ends of rollers 73 for vertical movement about horizontal axis 80.

FIG. 2 shows the operational position of the bale thrower. As the bales leave the bale case 16 they are directed into the bite between belts 66 and 76 which rotate in opposite directions to accelerate the bales upwardly and rearwardly toward a trailing wagon (not shown). A substantially fixed spacing between the belts is maintained by rod 81 which is pivotally connected at 82 to bracket 83 on arm 68. Rod 81 projects through a hole in bracket 84 on belt frame 72 for sliding movement relative thereto. A washer 87 is welded to rod 81 below bracket 84 and a series of spacers 88 fix the minimum distance therebetween. A compression spring 85 acts against bracket 84 and free-sliding washer 86 to absorb upward forces exerted on conveyor 71 during the ejection of a bale. Any suitable means may be employed to prevent washer 86 from slipping off the end of rod 81, such as, for example, the cotter pin shown. A similar rod and bracket arrangement is located on the opposite side of the thrower to promote stability.

Figure 3:
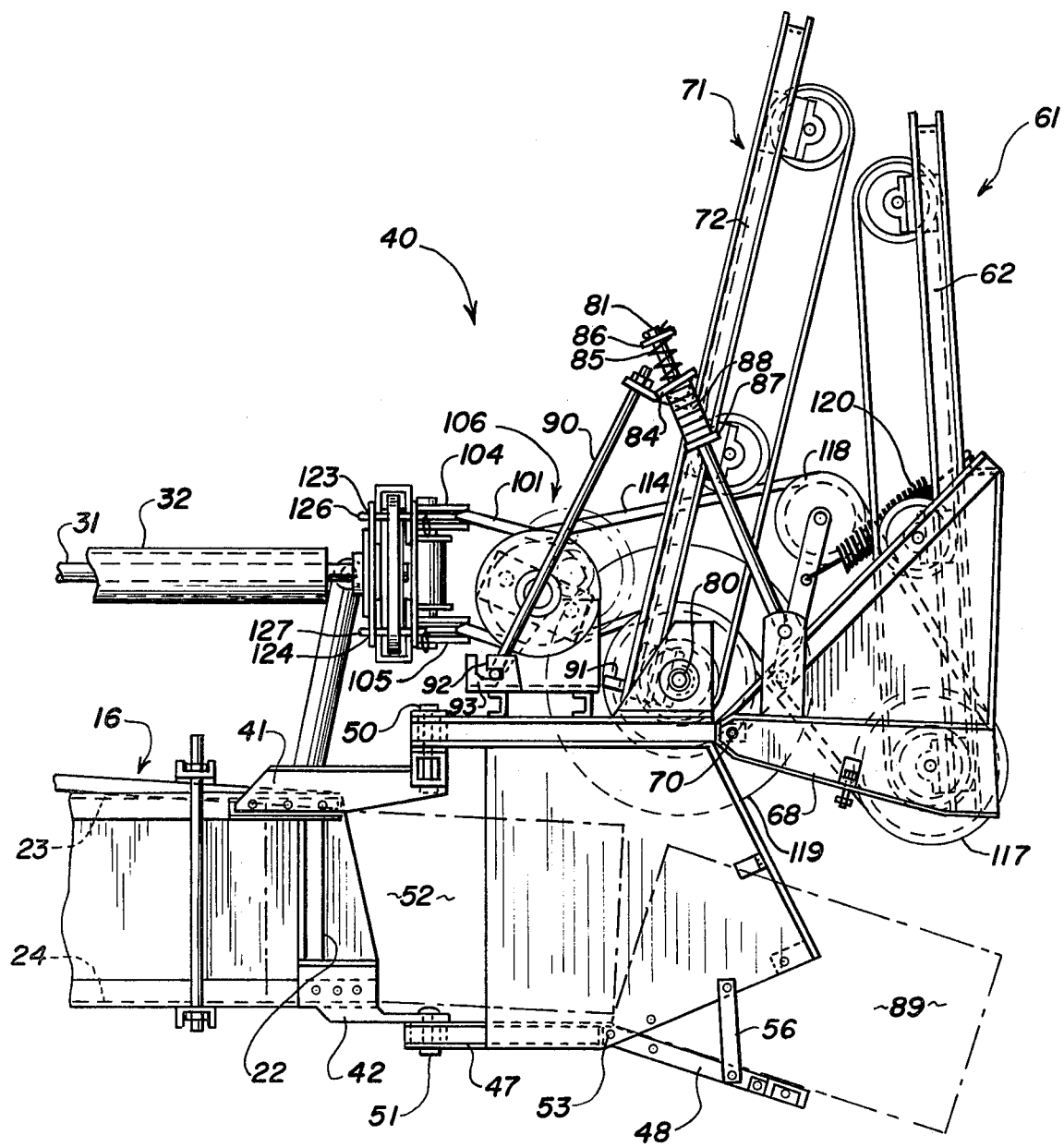
FIG. 3 is a view, similar to FIG. 2, showing the bale thrower in its second or inoperative position.

Referring to FIG. 3, the second or inoperative position of the bale thrower is shown. Bottom plate 48 has been moved to its lower, bale dropping position, and both conveyors 61 and 71 pivoted upwardly. More specifically, conveyor 61 has been pivoted about horizontal axis 70 to open the rearward end of the second frame to allow bales, such as 89, to be guided by plate 48 toward the ground. Conveyor 71 has been pivoted counterclockwise about horizontal axis 80 to allow clearance for conveyor 61. A rod 90 is shown in FIG. 2 to be fixed at one end to a portion of bracket 84, and held at the other end by spring clamp 91. In FIG. 3, rod 90 is shown to be engaged with slot 92 in bracket 93. Thusly, the two conveyors are fixed in the inoperative position.

The drive system for the thrower is similar to those shown in the cited prior art patents, but does include some important modifications. Generally, the mechanical drive disclosed herein (1) changes the rotational power direction 90°, and (2) moves the power application from one side of the thrower, adjacent shaft 31, to the other where it is used to rotate the various working elements.

The torque transmitted by shaft 31 is moved through a 90° angle by endless belt 101 extending between sheaves 102 and 103 around horizontal sheaves 104 and 105 (best seen in FIGS. 1 and 2). The rotational drive force is transferred to the opposite side of the thrower by a power transfer mechanism 106. Mechanism 106 comprises a shaft 107 having end sheaves 103 and 108 fixed thereto. Shaft 107 is rotatably supported by arms 109 and 110 which are in turn supported, respectively, by plates 111 and 112 fixed to the second frame, for pivotable movement about horizontal axis 113.

An endless belt 114 is operably connected to sheaves 108, 116, 117 and tensioned idler 118 to operate conveyors 61 and 71 in the desired manner. A flywheel, such as 119, may be employed to advantageously "smooth out" the power surges which the system may experience. The idler 118 is held in biased contact with endless belt 114 by a spring 120 fixed to belt frame 62.

Thus it can be seen that movement from the operative position shown in FIG. 2 to the inoperative position of FIG. 3 provides some slack in endless belt 114. This slack permits power transfer mechanism 106 to pivot counterclockwise about axis 113 to relieve tension in endless belt 101 and substantially stop operation of the thrower.

Shaft 31 continuously rotates in the structural arrangement shown and, even when the thrower is in the inoperative position has a tendency to cause severe wear on replacement items, particularly endless belt 101. Various mechanisms have been employed to control the relationship between shaft 31 and the thrower including movable tensioning devices for belt 29; however, none have been completely satisfactory from the point of view of convenience and cost. The simple arrangement shown in FIG. 4 solves this problem in a unique and quite satisfactory manner.

Sheave 102 is protected laterally by side plates 121 and 122 which form part of a larger protective housing. Two holes, 123 and 124, extend through plates 121 and 122 at distances from the axis of sheave 102 greater than the radius thereof. Thus, when the tension is released from endless belt 101, it may be manually pulled beyond holes 123 and 124, and pins, such as 126 and 127 (see FIG. 2) inserted therein to hold the belt away from the rotating sheave. Of course, the pins are removed when it is desired to operate the bale thrower and repositioned in the holes, above the relocated belt, for storage.

Thus, a novel bale thrower co-operable with a baler has been described. The structural configuration of the preferred embodiment set forth above very satisfactorily solves the major problems heretofore associated with bale throwers. The pivoting feature of the instant thrower allows an operator to quickly and easily change operation mode, and to efficiently withdraw or service the baler plunger. This latter feature, as understood by one of skill in the art, is extremely advantageous inasmuchas the plunger can only be removed or effectively serviced through the discharge end of the bale case. Previously, access to the plunger could be obtained only by removal of the thrower, which required the use of a hoist.

It will be understood that various changes in the details, materials, steps and arrangements of parts, which have herein been described and illustrated in order to explain the nature of the invention, will occur to and may be made by those skilled in the art upon a reading of the disclosure within the principles and scope of the invention.

For example, directional control means may be applied to the bale thrower to ensure correct positioning thereof relative to the trailing wagon. For example, a hydraulic cylinder may be affixed between the thrower and the bale case, or a more commonly known wagon tongue attachment may be employed.

Having thus described the invention, what is claimed is:

1. A bale thrower adapted to be affixed to the discharge end of the bale case of a hay baler, said bale case having a top wall and a bottom wall, said bale thrower comprising:
   (a) a first frame means adapted to be fixed to the discharge end of the bale case;
   (b) a second frame means pivotally fixed about a vertical axis to said first frame means;
   (c) bale ejector means pivotally fixed about at least one horizontal axis to said second frame means, said bale ejector means including first and second friction means for movably engaging, respectively, opposing sides of a bale, whereby said bale ejector means may be pivoted vertically about said at least one horizontal axis between operational and non-operational positions relative to the bale case; and
   (d) drive means operably connected to said bale ejector means.

2. The bale thrower of claim 1, wherein
   said first and second friction means comprise first and second endless belts, acting as conveyors, rotatably mounted on first and second belt frames, each of said first and second endless belts having an exposed substantially unobstructed surface; and
   said first and second belt frames are each pivotally fixed about separate horizontal axes to said second frame means so that the said surfaces of said first and second endless belts are in spaced apart opposition to each other.

3. The bale thrower of claim 2, wherein said horizontal axes are located relative to said first frame means such that they are above the top wall of the bale case when fixed thereto.

4. The combination of a hay baler and a bale thrower, said combination comprising:
   (a) a hay baler having an elongated bale case which extends in a fore-and-aft direction relative to ground travel, said bale case having a top wall and a bottom wall and including a rearward end opening through which bales are discharged;
   (b) a first frame means affixed to the discharge end of the bale case;
   (c) a second frame means pivotally fixed about a vertical axis to said first frame means;
   (d) a bale thrower pivotally affixed to said second frame means for selective movement about at least one horizontal axis between a first position in operative alignment with said rearward end opening of said bale case and a second position wherein said entire bale thrower is substantially out of alignment with said rearward end opening of said bale case; and
   (e) drive means operably connected to said bale thrower.

5. A bale thrower for baling machines including a bale-forming chamber, said bale thrower comprising:
   (a) a frame means adapted to be pivotally mounted adjacent the bale discharge end of the bale-forming chamber for lateral movement about a vertical axis, said frame means including a lower bale support, said bale support having a horizontal portion in substantial alignment with the bottom of the bale-forming chamber, and an adjustable portion pivotably connected to said horizontal portion for movement about a horizontal axis to selectively guide bales upwardly or downwardly;
   (b) conveyor means pivotally mounted on said frame means for vertical movement about at least one horizontal axis from a first operative position to a second inoperative position which does not obstruct the discharge of bales from the bale-forming chamber, said first position being at a positive angle with the horizontal to eject the bales in a generally upward direction, said conveyor means including first and second endless belt conveyors vertically spaced from each other a distance substantially equal to the height of the bales discharged from the bale-forming chamber into said conveyor means;

(c) guide means connected to said frame means for laterally directing bales from the bale-forming chamber to said conveyor means; and (d) drive means operably connected to said frame means for driving said endless belt conveyors in opposite directions to engage and eject bales.

6. The bale thrower of claim 5 wherein:

said first endless belt conveyor includes a first elongate belt frame having a first end and a second end and a first endless bale-engaging belt movably mounted therebetween, said first belt frame pivotably mounted at its first end to said frame means for selective movement about a first horizontal axis;

said second endless belt conveyor includes a second belt frame having a first end and a second end and a second endless bale-engaging belt movably mounted therebetween; and a support frame having a first end and a second end, said second end of said support frame rigidly connected to said first end of said second belt frame, said first end of said support frame pivotably connected to said frame means for selective movement about a second horizontal axis, whereby said first and second endless belt conveyors may be selectively moved about their respective horizontal axes between operative and inoperative positions.

7. The bale thrower of claim 6 further including:

connector means adjustably fixed to said first and belt frame and said support frame to control the distance between said first and second endless bale-engaging belts; and holding means affixed to said connector means for substantially locking said conveyor means in its second inoperative position.

8. The bale thrower of claim 7 wherein said drive means includes:

a driven sheave connected to a power transfer means by a first endless power belt;

a first sheave operably connected to said first endless bale-engaging belt;

a second sheave operably connected to said second endless bale-engaging belt;

a second endless power belt operably connected to said power transfer means, said first sheave and said second sheave; and tensioning means connected between said support frame and said second endless power belt for controlling the tension in said second endless power belt such that said first and second endless bale-engaging belts rotate when said conveyor means is in said first operative position, and do not rotate when in said second inoperative position.

9. The bale thrower of claim 8 wherein said power transfer means is pivotably mounted to said frame means to slacken said first endless power belt when said conveyor means is in said second inoperative position.

10. The bale thrower of claim 9 wherein said driven sheave is partially protected on each lateral side plates by parallel, and further includes:

at least a pair of spaced apart orifices through said parallel side guards, spaced from the axis of said driven sheave a distance greater than the diameter of said driven sheave; and a removable pin protrudes through each of said orifices.

* * * * *